United States Patent
Armangau

(10) Patent No.: US 10,089,032 B1
(45) Date of Patent: Oct. 2, 2018

(54) CONTROLLING WRITE SIZES TO REDUCE FLASH WEAR

(71) Applicant: EMC IP Holding Company LLC, Hopkinton, MA (US)

(72) Inventor: Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 13 days.

(21) Appl. No.: 15/281,688

(22) Filed: Sep. 30, 2016

(51) Int. Cl.
*G06F 3/06* (2006.01)

(52) U.S. Cl.
CPC .............. *G06F 3/064* (2013.01); *G06F 3/067* (2013.01); *G06F 3/0616* (2013.01); *G06F 3/0631* (2013.01); *G06F 3/0643* (2013.01); *G06F 3/0652* (2013.01)

(58) Field of Classification Search
CPC ...... G06F 3/0616; G06F 3/0652; G06F 3/064; G06F 3/067; G06F 3/0643; G06F 3/0631
USPC ........................................................ 711/103
See application file for complete search history.

(56) References Cited

U.S. PATENT DOCUMENTS

| | | |
|---|---|---|
| 9,286,007 B1 | 3/2016 | Bono |
| 9,400,792 B1 | 7/2016 | Bono et al. |
| 2016/0063018 A1* | 3/2016 | Das .................. G06F 17/30088 707/822 |

OTHER PUBLICATIONS

Walter O'Brien, et al.; "Utilizing Flash Optimized Layouts Which Minimize Wear of Internal Flash Memory of Solid State Drives," U.S. Appl. No. 15/086,508, filed Mar. 31, 2016.

\* cited by examiner

*Primary Examiner* — Jasmine Song
(74) *Attorney, Agent, or Firm* — BainwoodHuang

(57) ABSTRACT

A technique for managing storage in a data storage system sends a write from a second file system to a first file system at block-level granularity of the first file system and provides a set of flags that identify which flash-page-size portion(s) of a block are being changed. If the write is directed to a data block that is not shared, such that no write split is required, the improved technique checks the set of flags and proceeds to overwrite the data block in the first file system with only the flash-page-size portion(s) that have changed. The improved technique thus performs the overwrite in flash-page-size increments, avoiding writes to flash pages that remain unchanged.

17 Claims, 5 Drawing Sheets

CONTROLLING WRITE SIZES TO REDUCE FLASH WEAR

BACKGROUND

Data storage systems are arrangements of hardware and software that include storage processors coupled to arrays of non-volatile storage devices, such as magnetic disk drives, electronic flash drives, and/or optical drives and the like. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly store file systems that can be accessed by hosts over a network. For example, clients of host machines can store their files and directories in file systems on a data storage system, which acts as a file server or NAS (Network Attached Storage) server. File systems are commonly denominated in blocks, where a "block" is the smallest unit of storage that can be allocated in a file system. Common block sizes are 8 KB, for example, although block sizes may vary.

SUMMARY

Data storage systems increasingly use flash drives as alternatives to magnetic disk drives, as flash drives typically have much faster access speeds than magnetic disk drives. The increased use of flash drives brings new challenges, however. For example, flash drives tend to have limited lifespans, as each write to a flash drive may cause microscopic damage to storage cells.

One factor that tends to increase wear in flash drives is that the size of file system blocks tends to be a multiple of the page size of flash drives. A consequence of this mismatch is that file systems may write to flash drives in larger increments than are necessary. The effect is to increase the total amount of data written to the flash drives, which contributes to their premature wear.

Some data storage systems employ an arrangement in which a first file system contains a file that itself serves as a volume upon which a second file system is deployed. In such nested file systems, it may be desirable for the second file system to optimize for writes to flash, e.g., by writing to the first file system in increments equal to the page size of flash.

Unfortunately, writing from the second file system to the first file system at flash-level granularity causes inefficiencies. For example, when a block being written in the first file system is shared, the write can result in a write split. In such cases, the first file system performs an inefficient read of the shared block and copies portions of its contents that are not being overwritten to a newly allocated block. The first file system then writes the remaining portions of the new block with the changes arriving from the second file system. Such reading and copying operations are inefficient and expensive, however, in terms of both disk accesses and computing resources.

In contrast with this inefficient and expensive approach, an improved technique for managing storage in a data storage system sends a write from a second file system to a first file system at block-level granularity of the first file system and provides a set of flags that identify which flash-page-size portion(s) of a block are being changed. If the write is directed to a data block that is not shared, such that no write split is required, the improved technique checks the set of flags and proceeds to overwrite the data block in the first file system with only the flash-page-size portion(s) that have changed. The improved technique thus performs overwrites in flash-page-size increments, avoiding writes to flash pages that remain unchanged.

In some examples, if the write from the second file system is to a shared data block in the first file system such that a write split is performed, the first file system allocates a new block and writes the entire contents from the second file system to the newly allocated block.

Advantageously, the writes originating from the second file system proceed at flash-page-size granularity when no write splits are required, thereby avoiding unnecessary writes to flash and thus avoiding wear in the flash drives. Such flash drives are therefore expected to have a longer service life than they would have without the benefit of this technique.

Certain embodiments are directed to a method of managing data storage. The method includes, in a data storage system in which a first file system includes a file upon which a second file system is deployed, receiving, by the first file system, a write request from the second file system. The write request specifies a write of a block-size amount of data to a block at a location in the file of the first file system. The write request provides a set of flags, the set of flags configured to designate a set of portions of the block that are being changed. Each portion of the block has a size that matches a page size of a set of flash drives that back the block being written. The method further includes performing a testing operation to determine whether the block to which the write request is directed is a shared block in the first file system. In response to the testing operation determining that the block being written is not a shared block, the method still further includes writing to the set of flash drives only the portion or portions of the block that the set of flags designate as being changed, such that any portion of the block that is not being changed is not written to the set of flash drives and an amount of data written to the set of flash drives is reduced.

Other embodiments are directed to a data storage system constructed and arranged to perform a method of managing data storage, such as the method described above. Still other embodiments are directed to a computer program product. The computer program product stores instructions which, when executed on control circuitry of a data storage system, cause the data storage system to perform a method of managing data storage, such as the method described above.

The foregoing summary is presented for illustrative purposes to assist the reader in readily grasping example features presented herein; however, it is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing storage in a data storage system sends a write from a second file system to a first file system at block-level granularity of the first file system and provides a set of flags that identify which flash-page-size portion(s) of a block are being changed. If the write is directed to a data block that is not shared, such that no write split is required, the improved technique checks the set of flags and proceeds to overwrite the data block in the first file system with only the flash-page-size portion(s) that the flags indicated have changed.

Figure 1:
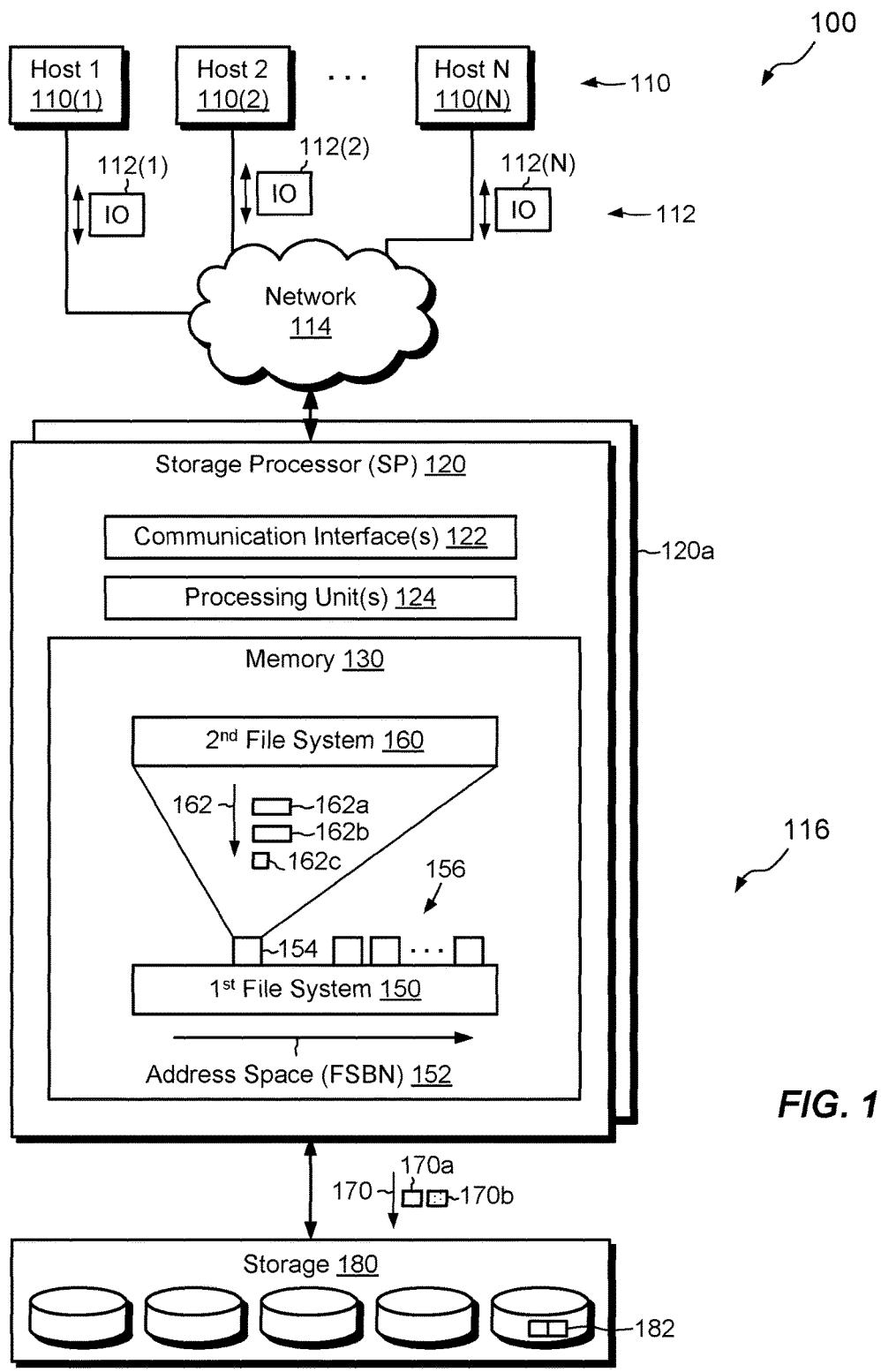
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 (i.e., 110(1) through 110(N)) access a data storage system 116 over a network 114. The data storage system 116 includes a storage processor, or "SP," 120 and storage 180, such as multiple flash drives. In an example, the flash drives are arranged in RAID (Redundant Array of Independent Disks) groups. Each flash drive is addressed in pages 182, where a flash page may be the smallest unit of storage that may be written or read from the flash drive. A common flash page size may be 4 KB, for example, although flash page sizes may differ for different makes, models, vendors, or types of flash drives.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 (i.e., 112(1) through 112(N)) according to block-based and/or file-based protocols and to respond to such IO requests 112 by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes a first file system 150 and a second file system 160. The first file system 150 has an address space 152, which ranges, for example, from zero to some large number. The first file system 150 is denominated in blocks, which may be 8 KB in size, for example, and each block has a unique address in the address range 152. The address of each block may be designated by File System Block Number, or "FSBN."

The first file system 150 is seen to include a file 154 and other files 156. In an example, the data and metadata of each of the files 154 and 156 are implemented entirely within the first file system 150, i.e., in blocks of the file system 150.

In the example shown, the second file system 160 is deployed upon the file 154 of the first file system 150. For example, the file 154 has a logical address space, which may be rendered as a LUN (Logical UNit) or volume upon which the second file system 160 is built. Given this arrangement, the second file system 160, including all of its data and metadata, are contained within data of the file 154 of the first file system 150. This nested arrangement provides many advantages. For instance, the data storage system 116 may take snaps (point-in-time versions) of the second file system 160 merely by snapping the file 154. In an example, files 156 are snaps of file 154, meaning that each of the files 156 provides a complete version of the second file system 160 at a respective earlier point in time. Each of the files 156 may thus be deployed as an operational file system, which may be used, for example, for recovery or other roll-back purposes.

For efficiency, snaps created in files 156 initially share all data and much of their metadata with the file 154 when the respective snaps are taken. Over time, however, the file 154, which may host a live (production) version of the second file system 160, may continue to evolve, as it responds to IO requests 112 issuing writes, deletes, and so forth, to the second file system 160. As it evolves, the file 154 may tend to diverge from its snaps, as more and more of its data becomes unique.

Sharing may take place at the block level. For example, data blocks in the first file system 150 that back the file 154 may also back some of its snaps. Typically, some data blocks that back the file 154 will be shared and other data blocks will be unique, i.e., unshared. Anytime a write is directed to a portion of the file 154 that is backed by a shared block, the file system 150 performs a write split to support the change while preserving the shared block for use by whichever other file (or files) is sharing the block. To perform the write split, the first file system 150 allocates a new block and stores the newly arriving data in the new block. The old block remains unchanged, but its sharing relationship with the file 154 is severed.

In example operation and with attention to the particular improvements hereof, the hosts 110 issue IO requests 112 to the data storage system 116. The SP 120 receives the IO requests 112 at the communication interfaces 122 and initiates further processing. In an example, the IO requests 112 include a file-based request to write a file or other content object in the second file system 160. The second file system 160 receives the request and performs mapping and other activities to identify changes in data and/or metadata that are needed to complete the request.

As the second file system 160 is a logical construct built upon the file 154, the data storage system 116 translates writes affecting data and/or metadata of the second file system 160 into corresponding writes to the file 154. For example, the second file system 160 directs a translated write request 162 to the file 154. The translated write request 162 includes a block-size amount of data 162a (e.g., 8 KB, to match the block size of the first file system 150), an address 162b into the file 154 to which the write is directed, and a set of flags 162c. The set of flags 162c indicates which flash-page-size portion(s) of the data 162a is/are being changed. For a flash-page size of 4 KB, for example, the data 162a includes two 4 KB portions, and the set of flags 162c includes at least two bits to identify which portions are changing, e.g., the first portion, the second portion, or both.

The first file system 150 receives the translated write request 162 and performs a lookup of the data block found at the address 162b into the file 154. The first file system 150 then checks whether the data block at the address 162b is shared or unique. If the data block is unique, the first file system 150 proceeds to overwrite only the flash-page-size portion(s) of the data block that is/are changing, i.e., only the one(s) that the set of flags 162c designates as changing. The remainder of the data block, assuming that fewer than all portions are changing, remains unchanged and retain its previous data.

The act of the first file system 150 writing to the portion(s) of the block that is/are changing induces a further-modified write request 170 to the underlying flash storage. The further-modified write request 170 is provided in flash-page-size increments, e.g., as increments 170a and/or 170b, and effect one or more writes to corresponding pages 182 in the underlying flash drives. One should appreciate that the number of pages written to flash reflects the number of portions of the data 162a that the flags 162 designate as changing. Thus, if the flags 162c specify that only a single portion (e.g., 4 KB) of a block is changing, then the request 170 will cause only a single page 182 of flash to be written. As a result, only half the amount of data is written to flash as would be the case without the above-described activities. The amount of data written to flash can thus be greatly reduced, helping to extend the lifespans of the flash devices.

If the data block addressed by request 162 had instead been a shared block, then a write split would have ensued and the entire block-size contents of the data 162a would have been written to a newly-allocated block. The result would have been an entire block-size write to flash (e.g., both 4 KB portions). This does not represent a penalty, however, as the entire block has to be written to flash in any case, i.e., to provide separate blocks for supporting separate files.

One should appreciate that the above-described technique may be especially beneficial for changes in metadata of the second file system 160. Whereas changes in data tend to affect all contents of a block, changes in metadata tend to affect only specific targeted regions. For example, changes to indirect blocks (IBs), which store arrays of block pointers, often affect only a single block pointer or a small range of block pointers. Such block pointer(s) may be entirely contained within a single flash-page-size portion of a block. Thus, the above technique is expected to be especially beneficial when used to update IBs of the second file system 160. Similar benefits may be experienced when using this technique with other types of metadata of the second file system 160, such as inodes, virtual block maps (VBMs), and the like.

Figure 2A:
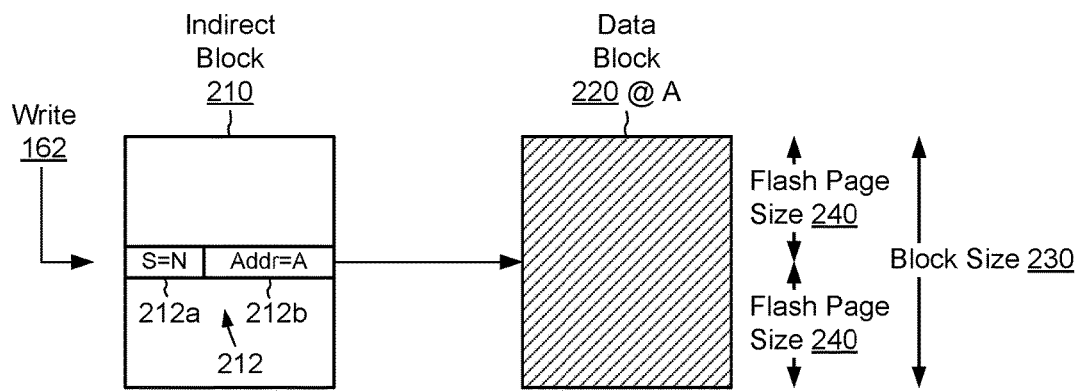
FIGS. 2A and 2B are block diagrams of example data and metadata blocks used when overwriting a flash-page-size portion of a data block when the data block is not a shared data block.
Figure 2B:
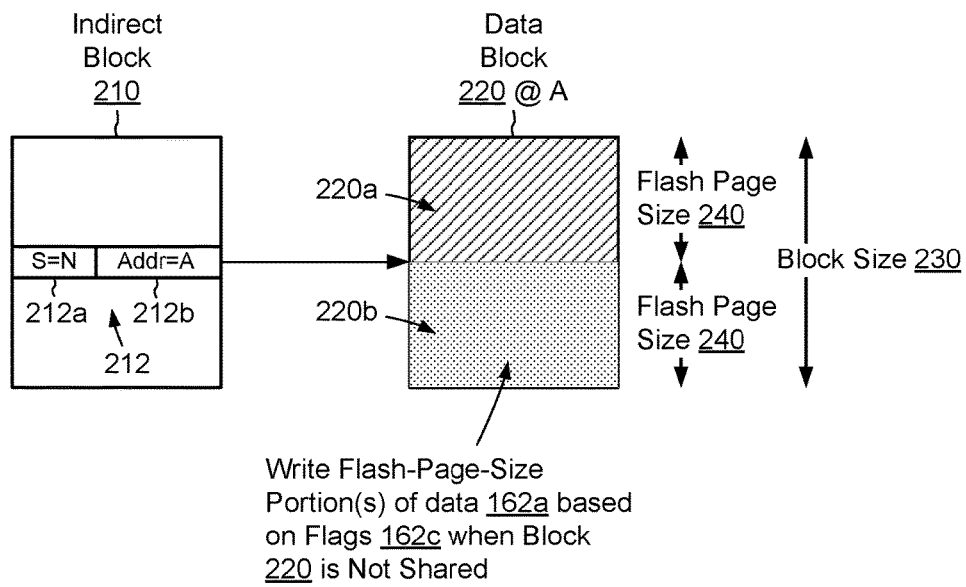

FIGS. 2A and 2B show an example arrangement for overwriting a unique (unshared) block of the file 154 in the first file system 150. Such overwriting is performed in response to receiving a modified write request 162 from the second file system 160.

As shown in FIG. 2A, the first file system 150 has mapped the modified request 162 to a particular indirect block (IB) 210 in the first file system 150. The IB 210 includes a block pointer 212 that points to a data block 220. The block pointer 212 has a position in the metadata of the file 154 that corresponds to the logical address 162b received with the modified request 162. Thus, the block 220 is the target of the modified write request 162.

The block pointer 212 is seen to include a sharing flag 212a and an address 212b. The address 212b points to the block 220 (e.g., by providing its FSBN, "A"), and the sharing flag 212a indicates whether the pointed-to block (220, in this case) is shared or unique. Here, the sharing flag 212a indicates that the block 220 is unique.

As further shown in FIG. 2A, the block 220 has a size 230 (e.g., 8 KB). Also, a size 240 of flash pages 182 is half the block size 230, such that the block 220 includes two flash-page-size portions (e.g., each 4 KB in size).

FIG. 2B shows the arrangement of FIG. 2A after overwriting has been performed. Rather than writing over the entire block 220, the first file system 150 instead checks the set of flags 162c (FIG. 1) and writes only that portion (or those portions) that the set of flags 162c designates as changing. In this case, the flags 162c indicate that only the flash-page-size portion 220b of the block 220 is changing, so only that portion of the block 220 is overwritten. The corresponding write to flash then affects only a single flash page 182, i.e., one that corresponds to the portion 220b of block 220. No write to flash is performed to any flash page 182 that corresponds to portion 220a of block 220, however, as flags 162c indicate that the portion 220a is not being changed.

Figure 3A:
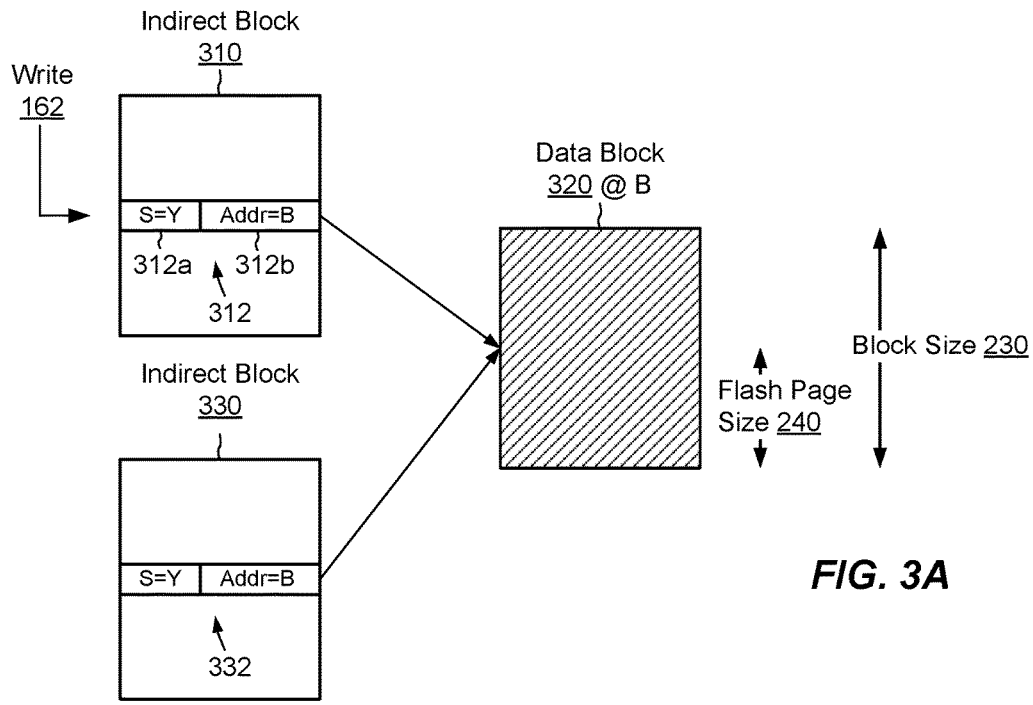
FIGS. 3A and 3B are block diagrams of example data and metadata blocks used when performing a write split on a shared data block.
Figure 3B:
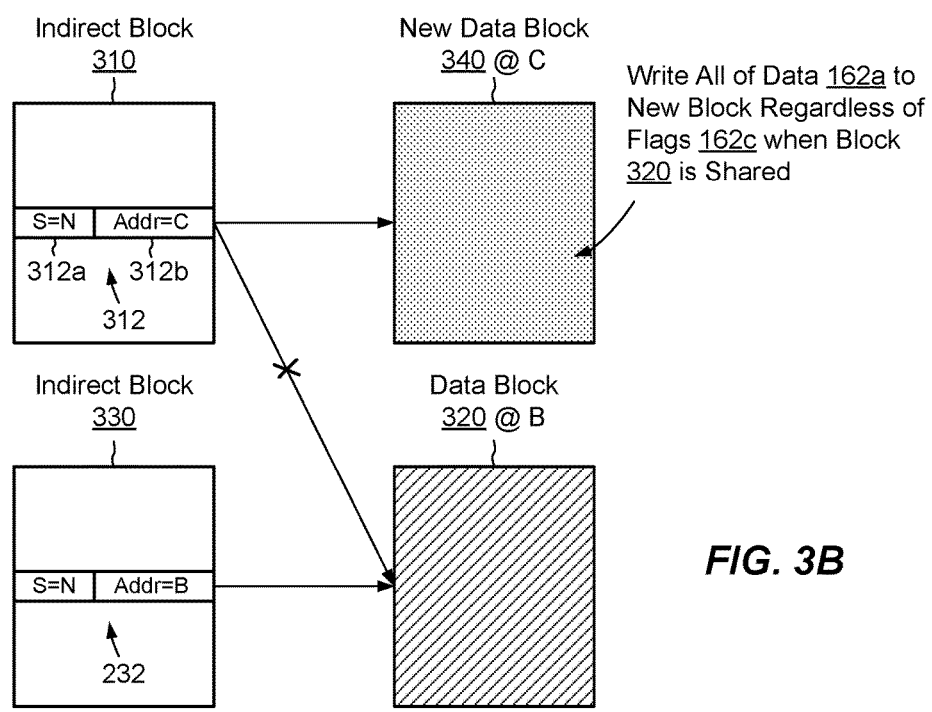

FIGS. 3A and 3B show an example arrangement for overwriting a share block of the file 154 in the first file system 150. Such overwriting is performed in response to receiving a modified write request 162 from the second file system 160. Here, the first file system 150 has mapped the modified write request 162 to block pointer 312 in IB 310.

Block pointer 312 has an address 312b, which points to data block 320 (at FSBN "B") and a sharing flag 312a indicating that block 320 is shared.

FIG. 3A shows the sharing arrangement, as block pointer 332 in IB 330 also points to block 320. As the block 320 is shared, it cannot simply be overwritten in response to request 162, as doing so would also change the other file sharing the block (e.g., one of the files 156), which one wishes to preserve. Rather, the first file system 150 performs a write split.

FIG. 3B shows a result of the write split. Here, the file system 150 has allocated a new block 340 (e.g., at FSBN "C") and has written the entire contents of the data 162a to the new block 340. Data block 320 remains untouched, and is thus preserved for purposes of the other file that previously shared the block 320. The file system 150 updates the block pointer 312 to point to the new block (see FSBN "C" in field 312b) and changes the sharing flag 312a to indicate that the pointed-to block is now unique. One should appreciate that the write split may also cause the block 320 to become unique (e.g., if there was only one other file sharing the block).

As a result of the write split, the entire contents of the block 340 are written to flash, i.e., at two flash pages 182. As previously indicated, this does not represent a penalty, as the flash drives must reflect the different contents of the two files in any case.

Figure 4:
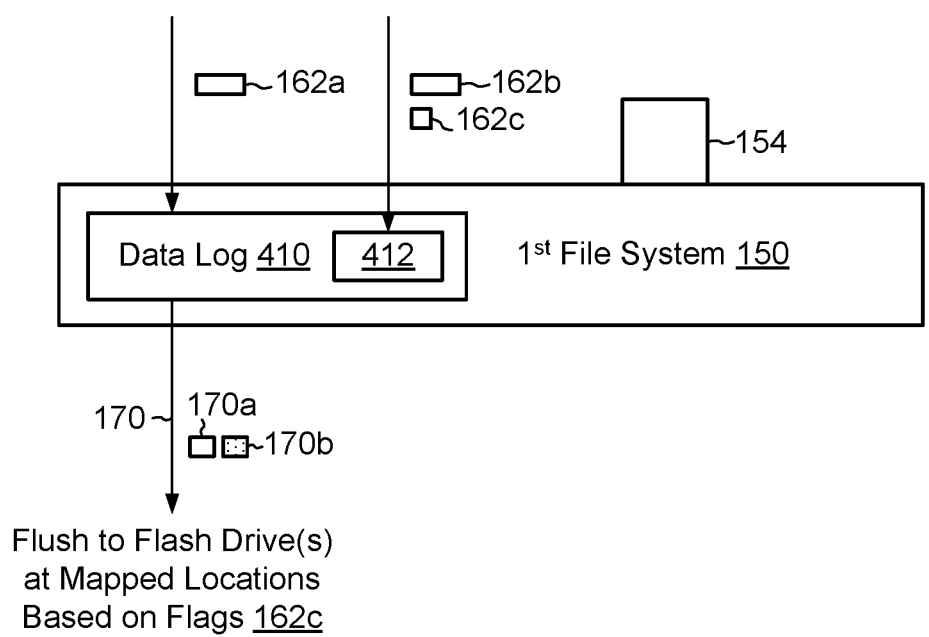
FIG. 4 is a block diagram showing an example data log used to capture incoming writes.

FIG. 4 shows a particular implementation in which the first file system 150 includes a data log 410. Here, the data log 410 serves the role of ingesting writes directed to the first file system 150 and quickly acknowledging their completion. In an example, the data log 410 is implemented in DRAM (Dynamic Random Access Memory) that is battery-backed and mirrored across SPs 120 and 120a, such that any data written to the data log 410 can be deemed persisted once it is successfully stored and mirrored. The SP 120 may later fix the data stored in the data log 410 in persistent structures of the file system 150 out of band with IO requests 112, i.e., when timing is less critical.

Here, the data log 410 captures incoming data 162a specified in modified write requests 162 in respective log entries. The data log 410 also stores corresponding address information 162b and flags 162c in log descriptors 412. In an example, the data log 410 identifies proper locations in the file system 150 where the data 162a are to be written, which locations correspond to particular pages 182 in the flash drives. The data log 410 then issues further modified requests 170 as flush operations. When flushing data 162a for a particular log entry, the data log 410 ignores writes to any flash pages 182 that back any portion(s) of the block (indicated by address 162b) that the corresponding flags 162c indicate are not being changed. Thus, the data log 410 effectively filters out updates to flash pages 182 whose data are not changing, even when the data are part of file system blocks that are changing.

Figure 5:
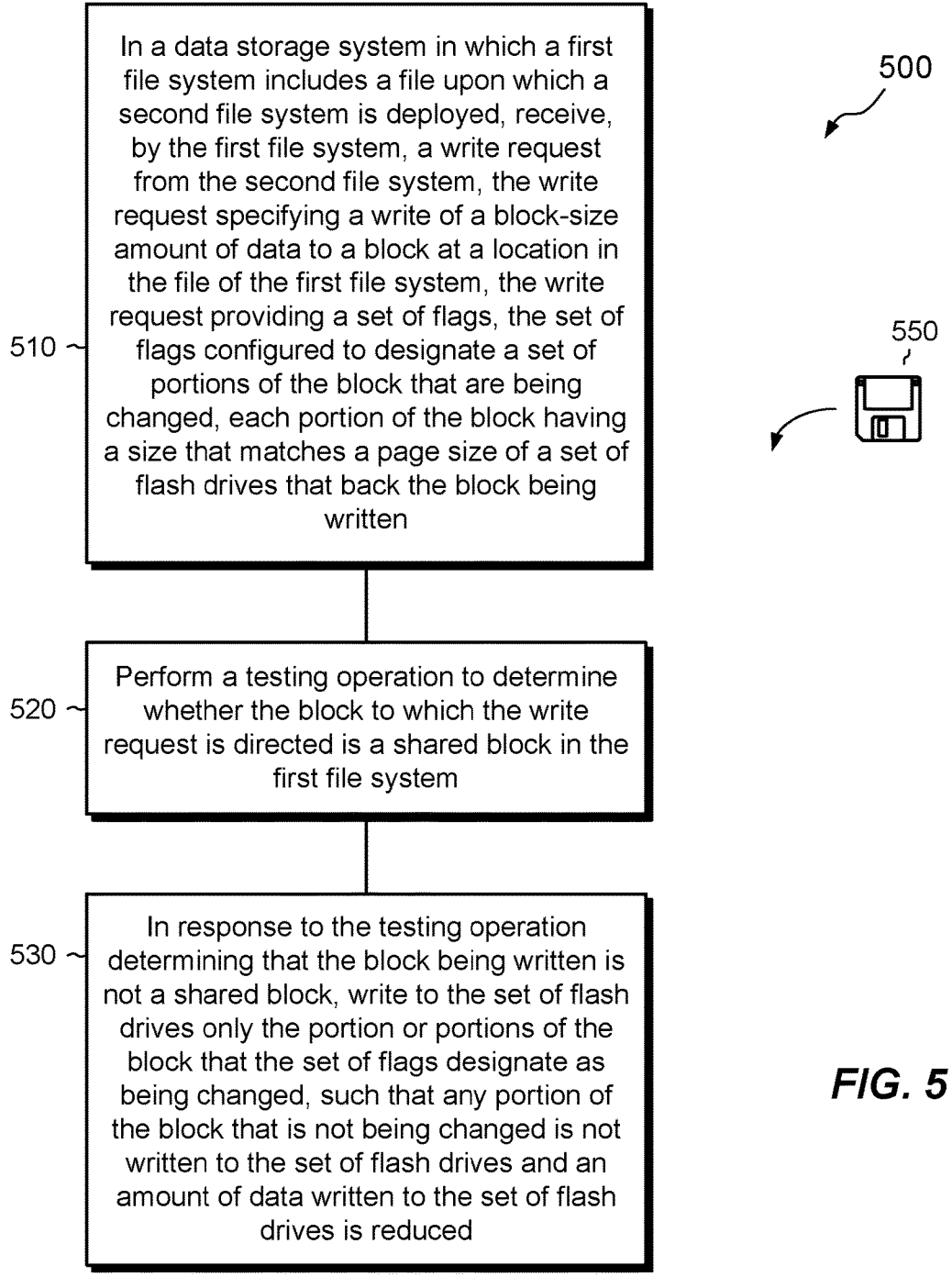
FIG. 5 is a flowchart showing an example method for managing data storage in accordance with improvements hereof.

FIG. 5 shows an example method 500 that may be carried out in connection with the environment 100. The method 500 is typically performed, for example, by the software constructs described in connection with FIG. 1, which reside in the memory 130 of the storage processor 120 and are run by the set of processors 124. The various acts of method 500 may be ordered in any suitable way. Accordingly, embodiments may be constructed in which acts are performed in orders different from that illustrated, which may include performing some acts simultaneously.

At 510, a data storage system 116 is provided in which a first file system 150 includes a file 154 upon which a second file system 160 is deployed. A write request 162 is received by the first file system 150 from the second file system 160. The write request 162 specifies a write of a block-size (230) amount of data 162a to a block 220 at a location 162b in the file of the first file system 150. The write request 162 provides a set of flags 162c, the set of flags 162c configured to designate a set of portions (220a and/or 220b) of the block 220 that are being changed. Each portion of the block has a size 240 that matches a page size of a set of flash drives (in storage 180) that back the block 220 being written.

At 520, a testing operation is performed to determine whether the block 220 to which the write request 162 is directed is a shared block in the first file system 150. For example, the block 220 is pointed-to by a block pointer 212 that includes a sharing flag 212a. The file system 150 may check the sharing flag 212a to determine whether the block 220 is shared or unique.

At 530, in response to the testing operation determining that the block being written is not a shared block, the data storage system 116 writes to the set of flash drives only the portion or portions (e.g., 220b) of the block 220 that the set of flags 162c designate as being changed, such that any portion of the block that is not being changed (e.g., 220a) is not written to the set of flash drives and an amount of data written to the set of flash drives is reduced.

An improved technique has been described for managing storage in a data storage system 116. The improved technique sends a write 162 from a second file system 160 to a first file system 150 at block-level granularity of the first file system 150 and provides a set of flags 162c that identify which flash-page-size portion(s) (e.g., 220a and/or 220b) of a block 220 are being changed. If the write is directed to a data block that is not shared, such that no write split is required, the improved technique checks the set of flags 162c and proceeds to overwrite the data block in the first file system 150 with only the flash-page-size portion(s) that have changed. The improved technique thus performs overwriting in flash-page-size increments, avoiding writes to flash pages that remain unchanged, and thereby preserving the lifespan of the flash devices.

Having described certain embodiments, numerous alternative embodiments or variations can be made. For example, although embodiments have been described herein where storage 180 consists entirely of flash drives, this is merely an example. Alternatively, storage 180 may include a combination of different storage types, such as magnetic disk drives and/or optical drives, as well as flash drives.

Also, embodiments hereof have been disclosed in which block sharing arises as a result of snaps. However, this too is merely an example. For instance, block sharing may also arise as a result of deduplication.

Also, the embodiments described herein specify two flash-page-size portions per block of the first file system 150. It should be appreciated, however, that the number of flash-page-size portions per file system block may differ in other embodiments. Thus, the invention hereof is not limited to any particular ratio of flash-page-size to block size.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data storage, the method comprising:
    in a data storage system in which a first file system includes a file upon which a second file system is deployed, receiving, by the first file system, a write request from the second file system, the write request specifying a write of a block-size amount of data to a block at a location in the file of the first file system, the write request providing a set of flags, the set of flags configured to designate a set of portions of the block that are being changed, each portion of the block having a size that matches a page size of a set of flash drives that back the block being written;
    performing a testing operation to determine whether the block to which the write request is directed is a shared block in the first file system;
    in response to the testing operation determining that the block being written is not a shared block, writing to the set of flash drives only the portion or portions of the block that the set of flags designate as being changed, such that any portion of the block that is not being changed is not written to the set of flash drives and an amount of data written to the set of flash drives is reduced;
    receiving, by the first file system, a second write request from the second file system, the second write request specifying a second block-size amount of data to be written to a second block at a second location in the file of the first file system, the second block also backed by the set of flash drives;
    performing a second testing operation to determine whether the second block is a shared block in the first file system; and
    in response to the second testing operation determining that the second block is a shared block, (i) allocating a new block to the file in the first file system and (ii) writing the second block-size amount of data to locations in the set of flash drives that back the newly allocated block.

2. The method of claim 1, wherein the file is a first file and the second block is shared between the first file and a second file in the first file system, the second file providing a snap of the first file, the snap of the first file providing an earlier point-in-time version of the second file system.

3. The method of claim 2, wherein the data specified by the second write request contains updated metadata of the second file system.

4. The method of claim 3, wherein the metadata of the second file system is an indirect block of the second file system, the indirect block including an array of block pointers used for addressing blocks in the second file system.

5. The method of claim 3,
    wherein receiving the write request from the second file system includes ingesting the block-size amount of data into a data log, the data log temporarily holding the data; and
    wherein writing to the set of flash drives includes, after performing the testing operation, flushing to the set of flash drives only the portion or portions of the block that the set of flags designate as being changed.

6. The method of claim 3, wherein the block includes two flash-page-size portions, and wherein the set of flags include at least two bits that indicate at least the following conditions: (i) whether the first flash-page-size portion of the block is changing, (ii) whether the second flash-page-size portion of the block is changing, or (iii) whether both the first and the second flash-page-size portions of the block are changing.

7. A data storage system, comprising control circuitry that includes a set of processing units coupled to memory, the control circuitry constructed and arranged to:
    receive, by a first file system including a file upon which a second file system is deployed, a write request from the second file system, the write request specifying a write of a block-size amount of data to a block at a location in the file of the first file system, the write request providing a set of flags, the set of flags configured to designate a set of portions of the block that are being changed, each portion of the block having a size that matches a page size of a set of flash drives that back the block being written;
    perform a testing operation to determine whether the block to which the write request is directed is a shared block in the first the system;
    in response to the testing operation determining that the block being written is not a shared block, write to the set of flash drives only the portion or portions of the block that the set of flags designate as being changed, such that any portion of the block that is not being changed is not written to the set of flash drives and an amount of data written to the set of flash drives is reduced;
    receive, by the first file system, a second write request from the second file system, the second write request specifying a second block-size amount of data to be written to a second block at a second location in the file of the first file system, the second block also backed by the set of flash drives;

perform a second testing operation to determine whether the second block is a shared block in the first file system; and in response to the second testing operation determining that the second block is a shared block, (i) allocate a new block to the file in the first file system and (ii) write the second block-size amount of data to locations in the set of flash drives that back the newly allocated block.

8. The data storage system of claim 7, wherein the file is a first file and the second block is shared between the first file and a second file in the first file system, the second file providing a snap of the first file, the snap of the first file providing an earlier point-in-time version of the second file system.

9. The method of claim 8, wherein the data specified by the second write request contains updated metadata of the second file system.

10. The method of claim 9, wherein the metadata of the second file system is an indirect block of the second file system, the indirect block including an array of block pointers used for addressing blocks in the second file system.

11. The method of claim 9, wherein the control circuitry, constructed and arranged to receive the write request from the second file system, is further constructed and arranged to ingest the block-size amount of data into a data log, such that the data log temporarily holds the data; and wherein, after performance of the testing operation, the control circuitry, constructed and arranged to write to the set of flash drives, is further constructed and arranged, to flush to the set of flash drives only the portion or portions of the block that the set of flags designate as being changed.

12. A computer program product including a set of non-transitory, computer-readable media having instructions which, when executed by control circuitry of a data storage system, cause the control circuitry to perform a method for managing data storage, the method comprising:

in a data storage system in which a first file system includes a file upon which a second file system is deployed, receiving, by the first file system, a write request from the second file system, the write request specifying a write of a block-size amount of data to a block at a location in the file of the first file system, the write request providing a set of flags, the set of flags configured to designate a set of portions of the block that are being changed, each portion of the block having a size that matches a page size of a set of flash drives that back the block being written;

performing a testing operation to determine whether the block to which the write request is directed is a shared block in the first file system;

in response to the testing operation determining that the block being written is not a shared block, writing to the set of flash drives only the portion or portions of the block that the set of flags designate as being changed, such that any portion of the block that is not being changed is not written to the set of flash drives and an amount of data written to the set of flash drives is reduced;

receiving, by the first file system, a second write request from the second file system, the second write request specifying a second block-size amount of data to be written to a second block at a second location in the file of the first file system, the second block also backed by the set of flash drives; and in response to determining that the second block is a shared block, (i) allocating a new block to the file in the first file system and (ii) writing the second block-size amount of data to locations in the set of flash drives that back the newly allocated block.

13. The computer program product of claim 12, wherein the file is a first file and the second block is shared between the first file and a second file in the first file system, the second file providing a snap of the first file, the snap of the first file providing an earlier point-in-time version of the second file system.

14. The computer program product of claim 13, wherein the data specified by the second write request contains updated metadata of the second file system.

15. The computer program product of claim 14, wherein the metadata of the second file system is an indirect block of the second file system, the indirect block including an array of block pointers used for addressing blocks in the second file system.

16. The computer program product of claim 14, wherein receiving the write request from the second file system includes ingesting the block-size amount of data into a data log, the data log temporarily holding the data; and wherein writing to the set of flash drives includes, after performing the testing operation, flushing to the set of flash drives only the portion or portions of the block that the set of flags designate as being changed.

17. The computer program product of claim 14, wherein the block includes two flash-page-size portions, and wherein the set of flags include at least two bits that indicate at least the following conditions: (i) whether the first flash-page-size portion of the block is changing, (ii) whether the second flash-page-size portion of the block is changing, or (iii) whether both the first and the second flash-page-size portions of the block are changing.

* * * * *